US011455345B2

(12) United States Patent
Underwood et al.

(10) Patent No.: US 11,455,345 B2
(45) Date of Patent: Sep. 27, 2022

(54) COLLABORATION ENVIRONMENTS THAT SUPPORT OFFLINE EDITS OF SHARED DOCUMENTS

(71) Applicant: Apple Inc., Cupertino, CA (US)

(72) Inventors: David A. Underwood, Cupertino, CA (US); Marcelo Boff, Vancouver (CA); Kwok Fai Lai, Hong Kong (CN); Jesse Chapman, Suginami-ku (JP); Darryl Fuller, North Vancouver (CA); Douglas M. Whitmore, Santa Cruz, CA (US); Paul D. Zirkle, San Jose, CA (US); Benjamin A. C. Forsyth, Telkwa (CA); Chi Yung Tse, Hong Kong (CN)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 16/669,258

(22) Filed: Oct. 30, 2019

(65) Prior Publication Data

US 2021/0133253 A1     May 6, 2021

(51) Int. Cl.
*G06F 17/00*         (2019.01)
*G06F 16/93*         (2019.01)
*G06F 16/176*        (2019.01)
*H04L 67/1095*       (2022.01)
*G06F 40/103*        (2020.01)
*G06F 40/166*        (2020.01)

(52) U.S. Cl.
CPC ............ *G06F 16/93* (2019.01); *G06F 16/176* (2019.01); *G06F 40/103* (2020.01); *G06F 40/166* (2020.01); *H04L 67/1095* (2013.01)

(58) Field of Classification Search
CPC ...... G06F 16/93; G06F 40/103; G06F 40/166; G06F 16/176; H04L 67/1095

USPC .......................................................... 707/608
See application file for complete search history.

(56) References Cited

U.S. PATENT DOCUMENTS

| 7,792,788 | B2 | 9/2010 | Melmon et al. |
| 8,738,706 | B1 | 5/2014 | Grieve et al. |
| 8,909,596 | B1 | 12/2014 | Zhang et al. |
| 9,384,295 | B2 * | 7/2016 | Hebbar .................. G06F 16/93 |
| 9,886,230 | B2 * | 2/2018 | Thimbleby .......... G06Q 10/101 |
| 10,956,667 | B2 * | 3/2021 | Danziger .............. G06F 40/197 |

(Continued)

OTHER PUBLICATIONS

Qinyi Wu, 'Modeling and Implementing Collaborative Editing Systems with Transactional Techniques', IEEE, Oct. 2010 (Year: 2010).*

(Continued)

*Primary Examiner* — Stephen S Hong
*Assistant Examiner* — Matthew J Ludwig
(74) *Attorney, Agent, or Firm* — Womble Bond Dickinson (US) LLP

(57) ABSTRACT

Document collaboration methods and systems that allow multiple users to create and edit a document are described. Such methods and systems can support devices that receive and process edits to one or more documents while the devices are off-line relative to a document collaboration service. These methods and systems can use a network based storage system (e.g., a "cloud storage platform") to store a document (e.g., "cloud storage document") that represents a recent collaboration state of the document based upon edits received from users who are (or have been) using the document collaboration service while one or more other users are off-line.

18 Claims, 11 Drawing Sheets

(56) References Cited

U.S. PATENT DOCUMENTS

| | | | | |
|---|---|---|---|---|
| 2002/0049786 | A1* | 4/2002 | Bibliowicz | G06F 40/169 |
| | | | | 715/234 |
| 2007/0073809 | A1* | 3/2007 | Sangem | G06F 30/39 |
| | | | | 709/205 |
| 2014/0337760 | A1 | 11/2014 | Heinrich et al. | |
| 2017/0357675 | A1* | 12/2017 | Underwood | G06F 16/93 |
| 2017/0359444 | A1* | 12/2017 | To | H04L 67/1095 |
| 2018/0168135 | A1* | 6/2018 | Bunner | A01K 83/00 |
| 2018/0219923 | A1* | 8/2018 | Berger | G06Q 10/101 |
| 2019/0097823 | A1* | 3/2019 | Simonyi | G06F 16/93 |
| 2019/0188210 | A1* | 6/2019 | Busch | G06F 16/23 |
| 2020/0050330 | A1* | 2/2020 | Schilling | G06F 9/44505 |

OTHER PUBLICATIONS

Feldman, 'SPORC: Group Collaboration using Untrusted Cloud Resources', 9th USENIX Symposium, 2010 (Year: 2010).*
Nacer, 'Concurrency Control and Awareness Support for Multi-synchronous Collaborative Editing, 9th IEEE International Conference on Collaborative Computing', 2013 (Year: 2013).*
"Conflict-free Replicated Data Types" https://hal.inria.fr/inria-00609399/en/, Aug. 27, 2011, last modification Mar. 21, 2019.
Ellis, C.A.; Gibbs, S.J. (1989), "Concurrency control in groupware systems", ACM SIGMOD Record 18(2): pp. 399-407.

* cited by examiner

Operation History

COLLABORATION ENVIRONMENTS THAT SUPPORT OFFLINE EDITS OF SHARED DOCUMENTS

BACKGROUND

The embodiments described herein relate to collaborative environments in which a document is created and edited by a group of users who can concurrently work on the document over time to create and edit the document.

Data processing systems that provide a collaborative environment to create and edit the document by multiple users, who are often creating and editing the document concurrently in time, have existed for some time. For example, Google Wave and Google Docs are examples of applications which can provide real time collaboration. One technology that has been used to facilitate such applications is a technology referred to as operational transformation which supports a range of collaboration functionalities in advanced collaborative software systems. Operational transformation was originally developed for consistency maintenance and concurrency control in collaborative editing of plain text documents. See for example Ellis, C. A.; Gibbs, S. J. (1989), "Concurrency control in groupware systems", ACM SIGMOD Record 18(2): 399-407. An example of a collaborative document environment that uses operational transformation is described in published US patent application publication number 2017/0357675 by inventors David Underwood, Elizabeth Reid and Peter Su; another example of a collaborative document environment is described in published US patent application publication number 2017/0359444 by inventors Chi Ming To, David Underwood, Man Hon Chan, Ralph Melton, Tamara Abell, and Tin Yin Lam. In some cases, prior collaborative document environments do not support devices that make edits to the document when the devices are offline; in other words, the devices must be online in order to participate in the collaborative environment.

SUMMARY OF THE DESCRIPTION

Document collaboration methods and systems that allow multiple users to create and edit a document are described. Such methods and systems can support devices that receive and process edits to one or more documents while the devices are off-line relative to a document collaboration service. These methods and systems can use a network based storage system (e.g., a "cloud storage platform") to store a document (e.g., "cloud storage document") that represents a recent collaboration state of the document based upon edits received from users who are (or have been) using the document collaboration service while one or more other users are off-line. In one embodiment, when a device has been off-line beyond a predetermined criteria (e.g., a time based criteria or a version number criteria or other criteria), the previously off-line device can receive the document, from the network-based storage system (e. g., a "cloud storage document") to resume or join the collaboration, and can use the received document to apply changes to the received document, where the changes are based on commands entered, but not acknowledged by the server, at the device while it was off-line. These commands are transformed after the cloud storage document is received and the transformed commands are applied to the received document to make the changes. The changes, in one embodiment, are based on transformations of the commands entered while off-line, and the transformations can be based on operations from received commands in an operation history that can be included with the received document from the cloud storage system. The operation history in one embodiment can include data about each of the commands but no content of the document (while the cloud storage document contains all of the content), and this can improve privacy aspects of some embodiments. The predetermined criteria, in one embodiment, can be based on the amount of time a document collaboration service retains a queue of current commands that have been received from users interacting at the document. If the device has been off-line for greater than that period of time, then in one embodiment it uses the document from the cloud storage platform to rejoin the collaboration rather than using a previously used local version of the document; on the other hand if the device has been off-line for less than (or equal to) that predetermined period of time, then the device can use its local version of the document and the commands in the queue from the document collaboration service to rejoin the collaboration using techniques described in, for example, published US patent publication number 2017/0359444.

A method according to at least one embodiment can include the following operations: establishing, at a first device, a connection to one or more servers that provide document collaboration services for multiple users to collaborate on a document processed by and stored on the one or more servers; receiving, at the first device, a first document that represents a recent collaboration state of the document based on changes to the document made by other devices while the first device was not connected to the one or more servers; applying, at the first device, one or more changes to the first document, the one or more changes based on one or more commands received at the first device while the first device was not connected to the one or more servers; and transmitting, from the first device to the one or more servers, one or more transformed commands that are based on the one or more commands received at the first device while the first device was not connected to the one or more servers. In one embodiment, the method can further include determining whether a second document, which was updated by the first device while the first device was not connected to the one or more servers, will be used to stay current with the recent collaboration state. In one embodiment, the second document will not be used to stay current with the recent collaboration state based on one or more of (a) a comparison of a revision sequence number associated with the second document to a revision sequence number associated with the first document; or (B) a time period that has elapsed since the first device was last connected to the one or more servers; or (C) a number of commands received by the one or more servers while the first device was not connected to the one or more servers. In one embodiment, the first document is received in response to determining that the second document will not be used to stay current. In one embodiment, the one or more commands which are received at the first device while the first device was not connected to the one or more servers, were applied to the second document prior to establishing the connection to the one or more servers.

In one embodiment, the methods described herein can further include the operations of: applying rollback operations and reapply operations to a later version of the first document stored at the first device after transmitting the transformed commands; losing the connection with the one or more servers after applying rollback and reapply operations and then reestablishing connection; determining in response to reestablishing the connection, that the later version of the first document will be used stay current with the collaboration (based on time criteria or revision sequence number criteria, etc.); and applying further rollback and reapply operations to the later version of the first document after reestablishing the connection. In one embodiment, the first document is a server truth document that represents and contains a most recent collaboration state of the collaboration, and the changes from all of the users in the collaboration are represented in the first document. In one embodiment, the first document includes an operation history that is a collection of entries, and each entry in the collection of entries includes a revision sequence number and a list of operations of all commands that were applied by the one or more servers in a server order to the first document, wherein the collection of entries are stored in the operation history in revision sequence order based on revision sequence numbers, and the operation history provides a sequential timeline of the operations of all commands that were previously applied to the first document in the server order. In one embodiment, the operations in the operation history specify changes in document structure but contain no content from the first document. In one embodiment, the method can further comprise the following operations: determining that a second document, which was updated by the first device with off-line commands while the first device was not connected to the one or more servers, will not be used to stay current with the recent collaboration state; and applying, by the first device, edits to the second document, wherein the edits are received at the first device and applied by the first device while the first device is applying the one or more changes (based on commands from other users) to the first document. In one embodiment, the method can further include the operation of discarding the second document after completing the application of the one or more changes to the first document, and using a later version of the first document to stay current with the collaboration. In one embodiment, the first document is received from a cloud storage platform service server which is distinct from the one or more servers that provide the document collaboration services while in another embodiment, the first document is received from a cloud storage platform service server which also provides the document collaboration services.

In one embodiment, a document collaboration server or set of such servers can perform the following operations: receiving one or more edits from one or more users in a set of users who have connected with one or more servers that manage a document collaboration system and who have edited a document hosted by the document collaboration system, the edits received while a first device is not connected to the one or more servers and the first device having made one or more changes to a local version of the document on the first device while not connected to the document collaboration system; establishing a connection with the first device that has made the one or more changes to the local version on the first device while disconnected from the document collaboration system; and transmitting, in response to determining that the local version is too old, a server truth document to the first device, the server truth document representing a recent collaboration state of the document in the document collaboration system; and receiving, from the first device, transformed commands that are based on commands applied to the local version while the first device was not connected to the document collaboration system.

The methods described herein can be implemented by data processing systems, such as a smartphone or desktop computer or laptop computer or tablet computer or entertainment system or other consumer electronic devices or server systems. The methods described herein can also be implemented by one or more data processing systems which execute executable instructions, stored on one or more non-transitory machine readable media (e.g., volatile DRAM or non-volatile flash memory, etc.), that cause the one or more data processing systems to perform the one or more methods described herein. Thus the embodiments described herein include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Document changes in a traditional collaboration architecture can be driven by a command design pattern. A command object can encapsulate a change to a document. Commands can be serialized and sent in a set of command objects to another node (e.g., another data processing system) in a realtime collaboration session so that the same change can be applied to any local copy of the document. All nodes in a session will eventually converge on the same document if they execute the same commands in the same order. In order to achieve this, the traditional collaborative environment includes a server which contains a document (the server copy) constructed from commands executed in the order in which it receives them (referred to as server order) from the clients in the environment. The server also broadcasts each command it receives to all participating clients (in the server order) allowing those clients to converge on the same document. Because a client executes its own commands locally before sending them to the server, every time it receives remote commands from the server (the collection of which may be referred to as a "diff"), the client must roll back the changes made by its local commands (not acknowledged as processed by the server), apply the changes made by the remote commands, apply transformations (e.g. operational transformations) to its local commands (which were rolled back) and then apply the transformed local commands. The client stores local commands in an outgoing command queue, where they remain, and they participate in the rollback and reapply until they are "acknowledged" in a diff received from the server.

Figure 1:
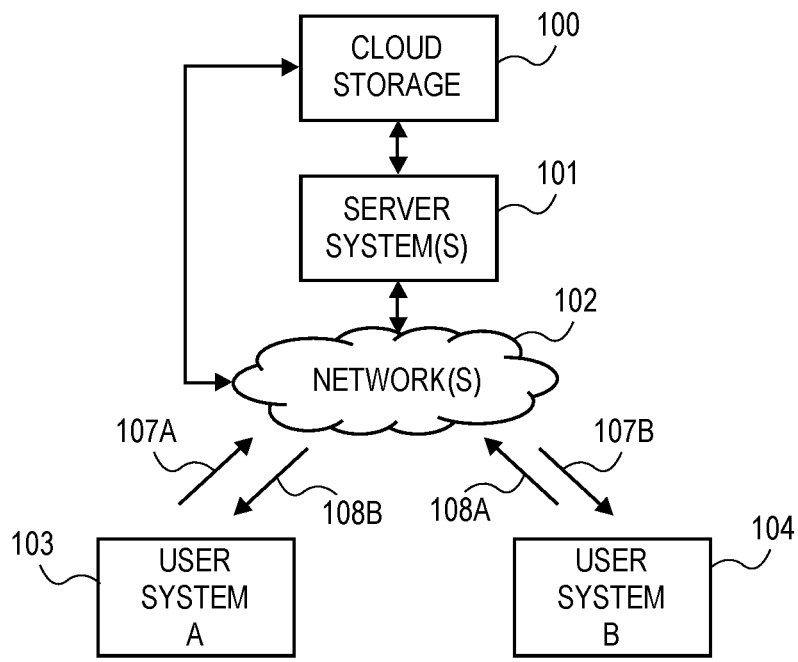
FIG. 1 shows an example of a collaborative environment which can include a plurality of user systems and one or more server systems.

A collaborative environment for creating a document among multiple authors or users typically involves a plurality of different user systems, each operated by a user and one or more server systems. FIG. 1 shows an example of such a collaborative environment. The collaborative environment shown in FIG. 1 includes one or more server systems 101 coupled through one or more networks 102 to a plurality of user systems, such as user system 103 and user system 104. The environment in FIG. 1 can also include one or more cloud storage systems 100 (e.g., iCloud from Apple Inc. of Cupertino, Calif.) that can receive server truth copies from the one or more server systems 101 and store those server truth copies for later transmissions to user systems such as user systems 103 and 104 as described further below. The one or more networks 102 can be, for example, the Internet. In other embodiments, the server system may be directly connected to each of the user systems through techniques known in the art or may be connected to the user systems through a local area network, etc. Each of the systems shown in FIG. 1 can be, for example, a desktop computer or a laptop computer or a tablet computer or other consumer electronic devices, although server systems are typically implemented with at least something like a desktop computer or other data processing system which can provide similar or greater processing power. In one embodiment, each of the systems can be executing a native application designed to create and edit a document, such as a word processing document, a spreadsheet document, a graphics document, a presentation document (such as Keynote or PowerPoint) or other types of documents which can be created in a collaborative environment. Thus, the user systems 103 and 104 can each include a native application, such as a word processing application to create the document in the collaborative environment and the server system can include a server version of that native application to receive commands and data from the user systems and to transmit updates to the documents to some or to all user systems. In an alternative embodiment, the user systems may use for at least some of the systems a web browser which can display a web page which includes embedded software that can enable the web page to display and process the document in a collaborative environment. For example, user system 103 may include a native application to process the document in a collaborative environment while the user system 104 can use a conventional web browser which is configured to process JavaScript or other software within a web page to enable the web browser to present the document in the collaborative environment and to process local commands to effect changes in the local copy as well as send changes to the server and to receive changes from the server and to process those changes in the manner described herein.

FIG. 1 shows how the collaboration can be performed by the transmission of commands from each user system to the one or more server systems 101 and by the receipt of commands from other systems, such as user system 103 and user system 104. In particular, user system 103 transmits its commands which specify changes to its copy of the document in a transmission 107A, and those commands are transmitted from the server system 101 to the user system 104 as transmission 107B. Similarly, the user system 104 transmits transmission 108A which includes commands indicating changes made by the user of user system 104 to the local copy on system 104. The transmission 108A is received by the one or more server systems 101 and processed to make changes to the server copy, and after those changes are made, the server transmits a transmission 108B which includes the commands indicating changes made by the user of system 104 for receipt by user system 103. In one embodiment, the server maintains the server copy which is considered the truth of the document and the system is implemented in a manner in which each client, such as user system 103 and user system 104 must execute the same commands in the same order (normally the server order) so that each user's document looks the same after processing all of the commands. The order of the commands is specified by the server and can be referred to as a server order and the copy on the server can be referred to as the server copy and can be considered the "truth" for the document being created in the collaborative environment. In one embodiment, each user system will transmit commands and data indicating changes to its local copy that have not been previously transmitted to the server systems or if they were previously transmitted have not been acknowledged as received and processed by the one or more server systems 101.

Figure 2:
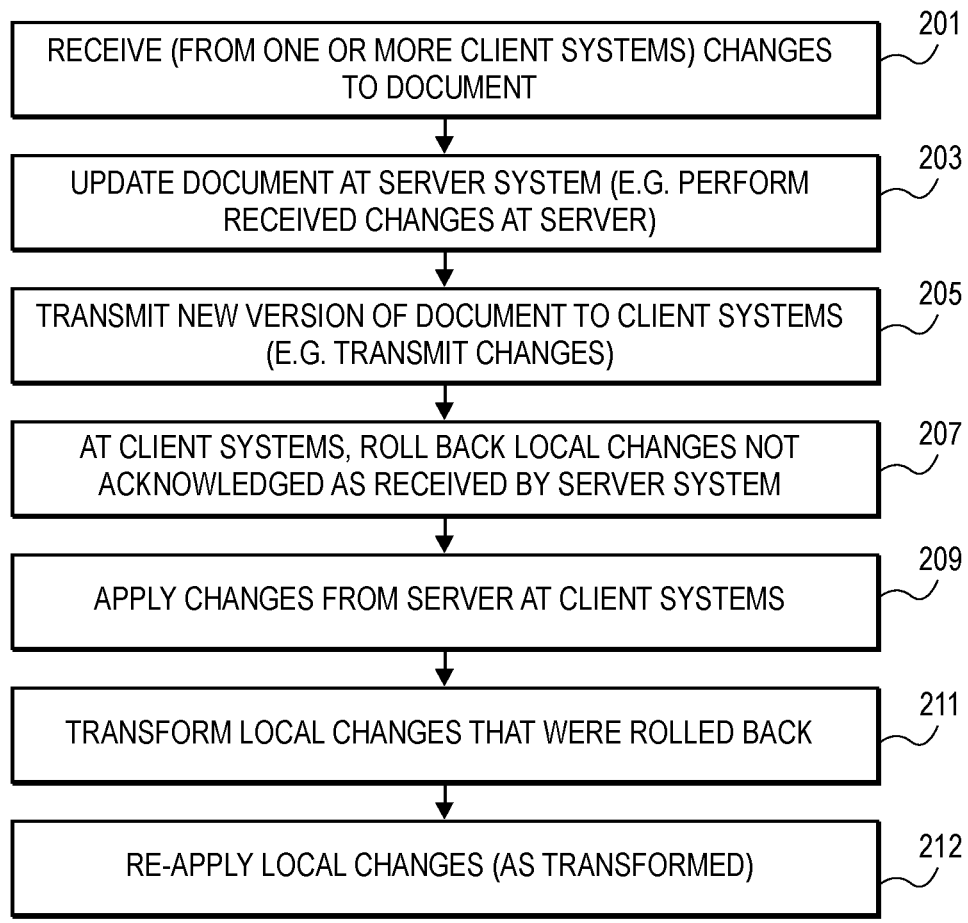
FIG. 2 is a flowchart which illustrates an overview of a method according to one or more embodiments described herein.

An overview of a method according to one embodiment will now be provided in conjunction with references to FIG. 2. The method shown in FIG. 2 can be used for devices that are online in the collaboration; further in one embodiment, the method shown in FIG. 2 can be used for a device that is offline for a short period of time and then rejoins the collaboration if the collaboration service supports short temporary disconnections. The methods shown in FIG. 2 can be implemented in the system shown in FIG. 1 for providing a collaborative environment for creating and editing a document. In operation 201, one or more server systems, such as server system 101, can receive (from one or more client systems) changes to a document in the collaborative environment. The changes can be indicated by one or more commands and data associated with the document. In one embodiment, each client may send only the most recent commands executed at the client system since the prior set of commands which were acknowledged as received and processed by the one or more server systems, such as server system 101. Thus, rather than transmitting the entire document from a client to the server and requiring the server to determine what the changes are, each client on its own determines what changes have occurred since the last transmission of commands which were acknowledged as received by the server system. In one embodiment, acknowledgement of receipt by the server system is performed by each client examining changes received from the server to determine whether a command which is sent by the client has been received by finding (and then ignoring) that command in the changes from the server. After the server receives in operation 201 the changes to the document from one or more client systems, the server system in operation 203 updates the document at the server system by performing the received changes (expressed as commands and associated data) at the server on the server's copy ("server copy"). In one embodiment, the server copy is considered the "truth" for the document, and the server stores in a list of commands in a particular order which is the server order of the commands that were executed on the server copy over time based upon the changes received from each of the user systems, such as user system 103 and 104 shown in FIG. 1. After the server system updates the document in operation 203, it can then transmit the new version (e.g., a list of changes) of the document in operation 205. In particular, in operation 205, the server system can transmit to all of the client systems the last set of changes that were made since the last transmission of changes from the server system. In one embodiment, only those changes are transmitted rather than transmitting the entire document. Prior commands that were transmitted by the server system to the client systems are not transmitted again in one embodiment. Then in operation 207, each client system which receives the transmission of the changes from operation 205 will perform a rollback operation. In one embodiment, a rollback operation will roll back the local changes or commands not acknowledged as received by the server system. In other words, each of the local commands executed at a user system that have not been sent to a server system or if sent were not acknowledged as received by the server system will be rolled back causing the document to change its state to the state which existed prior to all such local commands which were rolled back. The rolling back process undoes each of the commands that have not been sent or have not been acknowledged as received. This provides a consistency point at the client system and it ensures that all of the commands on the local copy at the client system will be executed in the same order as the commands on the server copy. Then in operation 209, the user system, such as user system 103 or user system 104 applies the changes from the server at the client system. In other words, the changes received through the transmission operation in operation 205 are applied to the rolled back version of the local copy in operation 209. Then in operation 211, each user system transforms the local changes that were rolled back by using, for example, known operational transformations to transform those local changes or local commands, which can then be reapplied to the local copy in operation 212. The method shown in FIG. 2 typically repeats over time as each user system receives local inputs and transmits those local inputs to the server system and receives changes from the server reflecting changes in the server copy over time. In each case, as the cycle repeats, the method shown in FIG. 2 is repeated over time.

In a real-time collaboration environment, a local client's edits to a document must be transformed against other remote clients' edits in order for the document to be eventually consistent across all clients without conflicts. Therefore, if a local client edits a document for a long period of time without network access to the collaboration server hosting the document (off-line editing), that client will need to download all intervening remote edits when the network connection is regained in order to transform local edits and catch up with the server truth document that represents the latest state of the document. In a traditional collaboration system, in which edits are encapsulated using the command design pattern, this can have significant costs. For example, commands that fully describe edits can consume substantial amounts of disk space, memory, and band width (if they encapsulate the insertion of large images or movies, for example). This consumes both client and server resources, and increases the amount of time required for an off-line client to catch up once the off-line client goes back online again. Commands can contain a complete encoding of the content that is added to a document, such as images, movies, or text. Storing a lengthy record of these commands can compromise user privacy by retaining potentially personally identifiable information that a user intended to delete at some point. Storing commands on a server for a long period of time may also violate privacy regulations regarding the long-term storage of personally identifiable information in some jurisdictions.

The embodiments described herein allow a system to reconnect and catch up (or resume) from off-line editing by using, in one embodiment, a combination of cloud storage and an operation history to preserve privacy and also provide improved performance over conventional document collaboration environments. The one or more embodiments described herein can do so using any cloud storage platform and can do so in a way that it allows a client to continue editing a document concurrently while it is catching up, making the experience as seamless for the user as possible. In one embodiment, a system can use an operation history which can store operations from commands applied to the document over time. In one embodiment, an operation history can store structural data relating to each command without including user data that can be included with each command; in one embodiment, each command can be considered an entity that includes user data and the structural data. Examples of such user data and structural data are provided below. Moreover, the embodiments described herein can use operational transformation operations to transform commands as described herein. In one embodiment, the operation history can be stored directly in a document file which is stored for users involved in the collaboration in a cloud storage platform. The cloud storage platform can be used to automatically synchronize across clients that participate in the collaboration environment. The synchronization with the cloud storage platform can occur independently of the collaboration environment and can be performed periodically over time to ensure each client has an up-to-date copy of the document received from the cloud storage platform. In one embodiment, the collaboration servers can periodically upload the latest server copy of the document in the collaboration environment to the cloud storage platform which can then be used as described further below. In one embodiment, a variant of operational transformation can be used in which operations only describe changes to the structure of a document but no content. For example, an operation can describe the number of characters inserted at a given index in a run of text without containing the actual text that was inserted. The actual text that was inserted can be obtained from the server copy provided from the cloud storage platform. As a result, the storage required for the operation history can be minimal and the operation history can contain no personally identifiable information. When a client device is off-line, it can locally accumulate a queue of commands that can be optimistically applied to the local copy of the document. When the client device reconnects to the collaboration service, it can wait for the cloud storage service to synchronize the latest version of the document by providing the latest version of the document with the most recent operation history. The operation history can then be used to transform the optimistically applied commands so that they can then be sent to other clients by, for example, sending the transformed commands to a server which then sends the transformed commands to other clients.

Figure 3:
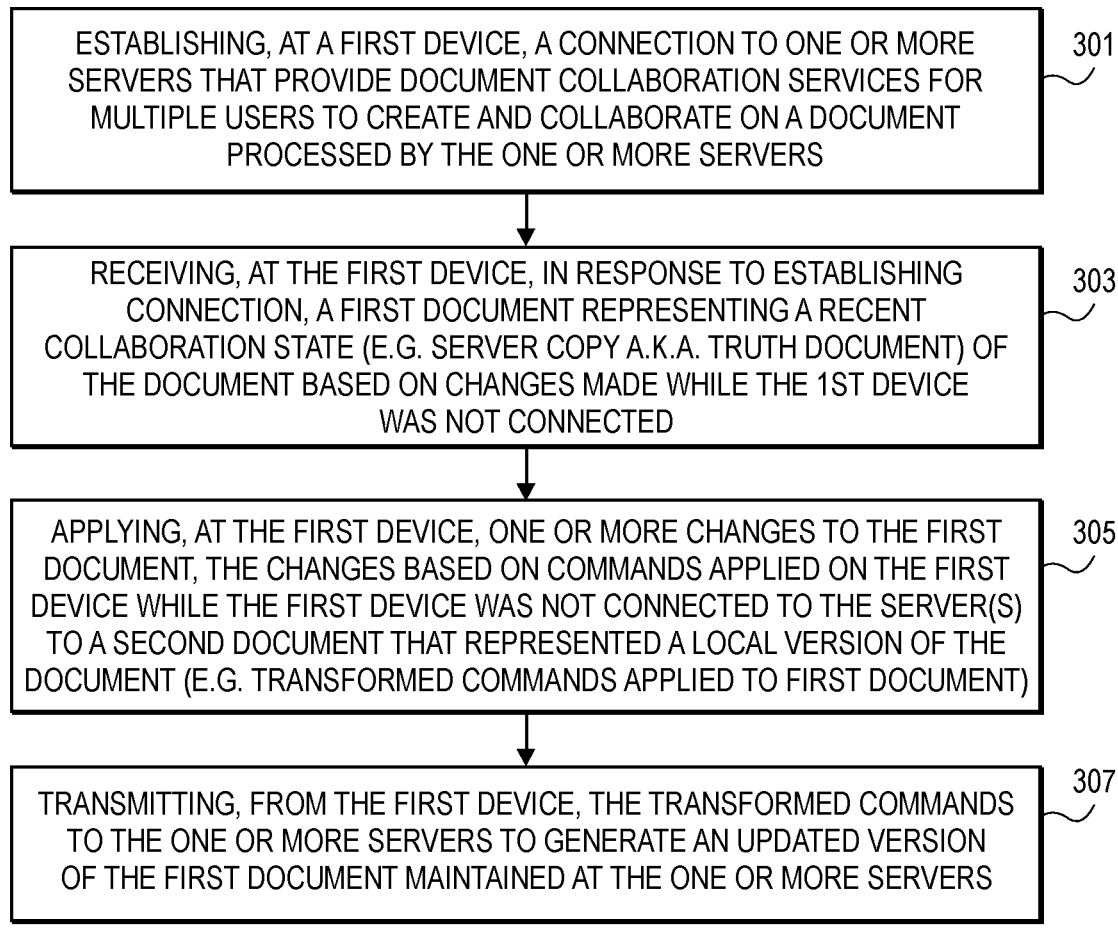
FIG. 3 is a flowchart which shows a method according to one embodiment described herein.

A method according to one embodiment is shown in FIG. 3, and this method can be performed by a client device which has been off-line relative to a collaboration service which includes one or more collaboration servers that are coupled to a cloud storage platform. In the method shown in FIG. 3, the off-line client device received commands from the user of the off-line client device while the off-line client device was not connected to the collaboration service (and hence was off-line relative to the collaboration service). Moreover, in this method other client devices were connected to the collaboration service and were providing changes to the document while the offline device was offline. The method shown in FIG. 3 shows an example of how the off-line device can reestablish the current state of the document. In operation 301, the first device can establish a connection to one or more servers that provide the document collaboration services for the multiple users. In operation 303, the client device can then receive in response to establishing connection, a first document representing a recent collaboration state, and this first document can be a server copy or truth document of the document based on changes, from other devices, that were made while the first device was not connected to the collaboration service. This first document, in one embodiment, can be received from a cloud storage platform that stores the server copy and the first document can include a complete, entire copy of the document. Then in operation 305, the client device can apply one or more changes to the first document, where these changes are based on commands applied to the local document while the device was not connected to the collaboration service. These changes are created by transforming the commands which were applied to the local document while the device was not connected to the collaboration service; the transformation of these commands can use conventional operational transformation techniques to transform these commands based upon the commands from the other devices that were received by the collaboration server. Once all of the off-line commands have been transformed to create transformed commands that change the first document, the first device can then transmit the transformed commands to the collaboration server to cause the collaboration server to generate an updated version of the first document maintained at the collaboration server and can also apply the transformed commands to the first document to create an up to date version of the document at the first device.

As is known in the art, operational transformation is a technique in which the semantic intent of the command can be preserved when the command is executed in a different order than that in which it was executed originally. This is accomplished by transforming the command based on the changes made by preceding commands (in server order). For example, if a command is optimistically applied that inserts the word "world" at location zero, and an earlier (in server order) incoming command is received that inserts the text "hello" (with a space) at location zero, the optimistically applied command can be transformed by the incoming command which is earlier in server order to insert its text (of the command being transformed, which is the insertion of the text "world") at location six, resulting in the insertion of "hello world" when both commands are executed in server order. The transformations can be performed by representing each command as a collection of a small number of primitive operations that can be transformed against one another. The transformations should produce the same results on any client or server, regardless of the initial order, satisfying the requirement that after any transformations, the same commands are executed in the same order which can be the server order. Such a system is described in publications such as Ellis, C. A.; Gibbs, S. J. (1989), "Concurrency control in groupware systems", ACM SIGMOD Record 18(2): 399-407.

Figure 4:
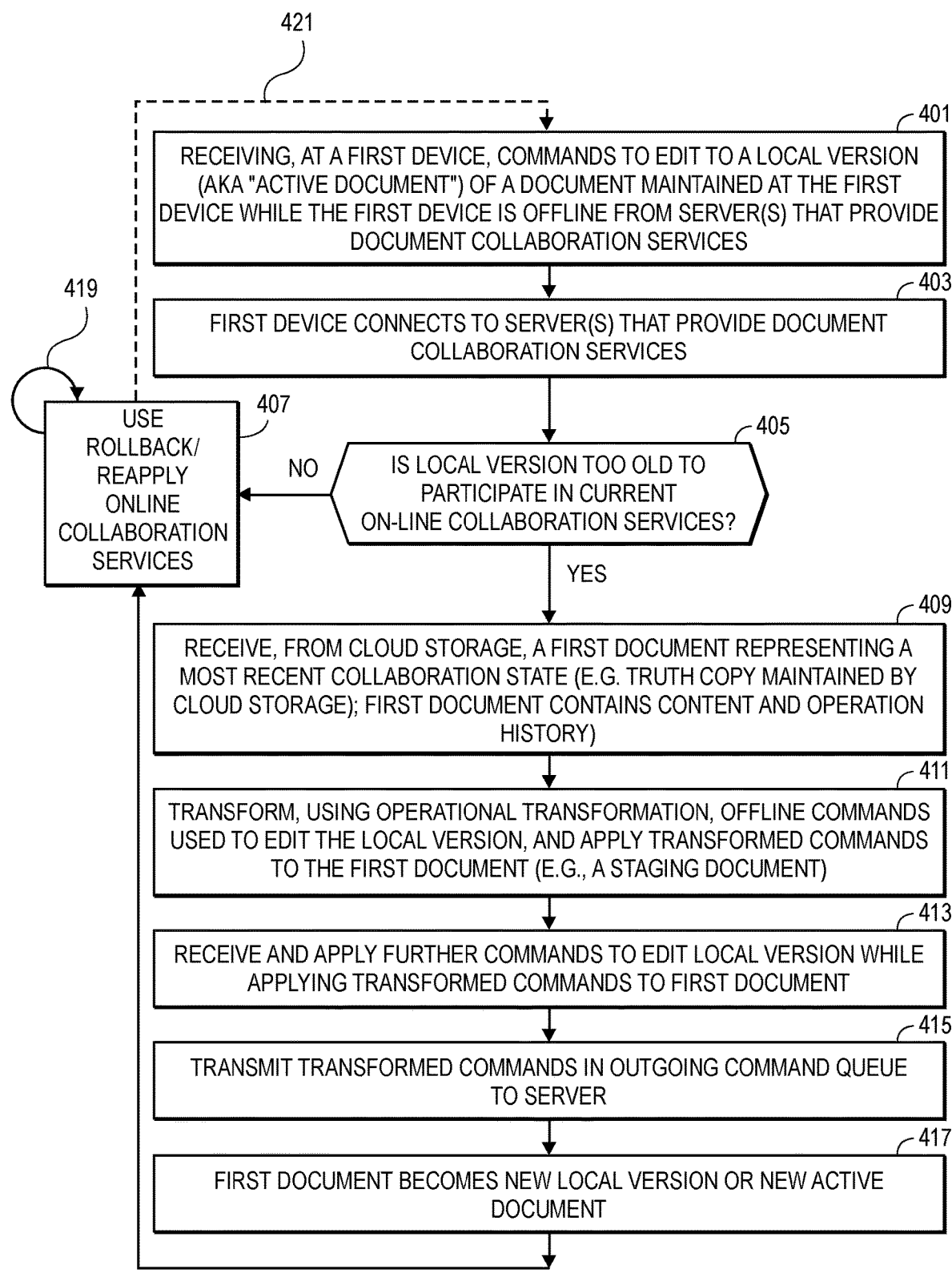
FIG. 4 is a flowchart which illustrates a method according to one embodiment described herein.

FIG. 4 shows a flowchart which illustrates a more detailed method according to one embodiment. The method shown in FIG. 4 can be performed by a client device which has been off-line relative to the collaboration service which has received changes from other devices that are online relative to the collaboration service, and the client device which performs the method of FIG. 4 can receive off-line commands from the user of the client device while the client device is off-line relative to the collaboration services. In operation 401 of FIG. 4, the first device receives commands to edit a local version of a document maintained at the first device while the first device is off-line from the one or more servers that provide document collaboration services. The local version of the document may be referred to as an "active document" (or a "second document") that is edited based upon the commands received while the first device is off-line relative to the collaboration service. Then in operation 403 the first device connects to the one or more servers that provide the document collaboration services, and now the first device is back on line relative to the collaboration service.

Then, the device and the one or more servers of the collaboration service perform an operation, shown in operation 405, in which the participants in this operation determine whether the local version maintained at the first device is too old to participate in the current online collaboration services. In one embodiment, operation 405 can use revision sequence numbers to determine whether the local version is too old. For example, a collaboration server can receive a revision sequence number of the local version and compare that revision sequence number to the revision sequence number of the version of the document at the collaboration server. In another embodiment, the decision rendered by operation 405 can be based upon time such as a time period of a truncated history at the collaboration server. For example, if the first device has been off-line relative to the collaboration service for a period of time that is longer than the time period (e.g. 5 minutes) of a truncated history at the collaboration server, then it is determined that the local version is too old to participate in the current online collaboration services. In one embodiment, a collaboration server may retain only the most recent set of commands received from client devices, and this most recent set can be limited based on time (such as the last 5 minutes of received commands); any commands older than the last 5 minutes are discarded. If the client device has been offline for longer than 5 minutes, the server cannot provide a list of commands to bring the client device up to date with the collaboration. In yet another embodiment, the decision rendered by operation 405 can be based upon the number of commands received by the collaboration server after the first device went off-line. If operation 405 determines that the local version is not too old, then processing proceeds to operation 407 which can use the method shown in FIG. 2 to maintain the state of the local version at the first device. As long as the first device remains connected and online relative to the collaboration services, operation 407 can repeat 419 until the first device goes back off-line again in which case operation 407 reverts 421 back to operation 401. In operation 407, the first device uses its local copy to update the local copy based on changes from the server rather than receiving a server truth copy of the entire document from the cloud storage platform (which occurs in operation 409 described below). If operation 405 determines that the local version is too old to participate in the current online collaboration services, then operation 409 follows operation 405.

In operation 409, the first device receives a first document which represents a most recent collaboration state of the document. In one embodiment, this first document is received from a cloud storage system, and this first document represents a server truth copy maintained by the cloud storage platform, and this first document can include the entire content of the document being created in the collaborative environment. In one embodiment, the collaboration server can be separate and distinct from the cloud storage platform, and the collaboration server can periodically upload the server truth document to the cloud storage platform through a network; in another embodiment, the cloud storage platform and the collaboration server can be combined together in a common system. In one embodiment, the first document can contain the content of the document as well as an operation history which will be described further below. In one embodiment of this collaboration system, the entire content of the shared document such as the first document can be permanently stored on the cloud storage platform in which copies of the document synchronize to all clients involved in the collaboration as it changes but not necessarily in real time with each edit, and with no built-in facilities for resolving conflicting concurrent edits from multiple clients. In such a system, the real time updates and preservation of all user edits is handled by the collaboration servers on temporary active copies of the document while the collaboration server is responsible for periodically uploading its copy of the document as the truth document with only server order commands applied, and the collaboration server uploads this truth document to the cloud storage platform. In this system, client devices may download updated versions of the truth document in the background via periodic synchronizations from the cloud storage platform, but the user of client devices can always interact with the temporary active copy of the document that may contain optimistically applied edits.

In operation 411, the first device can transform, using operational transformation techniques, the off-line commands which were used to edit the local version (for example in operation 401) and apply those transformed commands to the first document which can be referred to as a staging document. In this operation 411, the operations can use a variation of operational transformation where the transformations only contain information (e.g. structural data) about the structure of an edit but not the content of that edit. For example, a command that inserts the text "hello" into a text storage with identifier A at location 0 (zero):

Insert text ("hello", A, 0)

has a corresponding operation that just describes the location and length of the insertion, but does not describe the inserted text (which can be considered to be user data) itself:

Replace range (A, {0,0}, 5).

Figure 5:
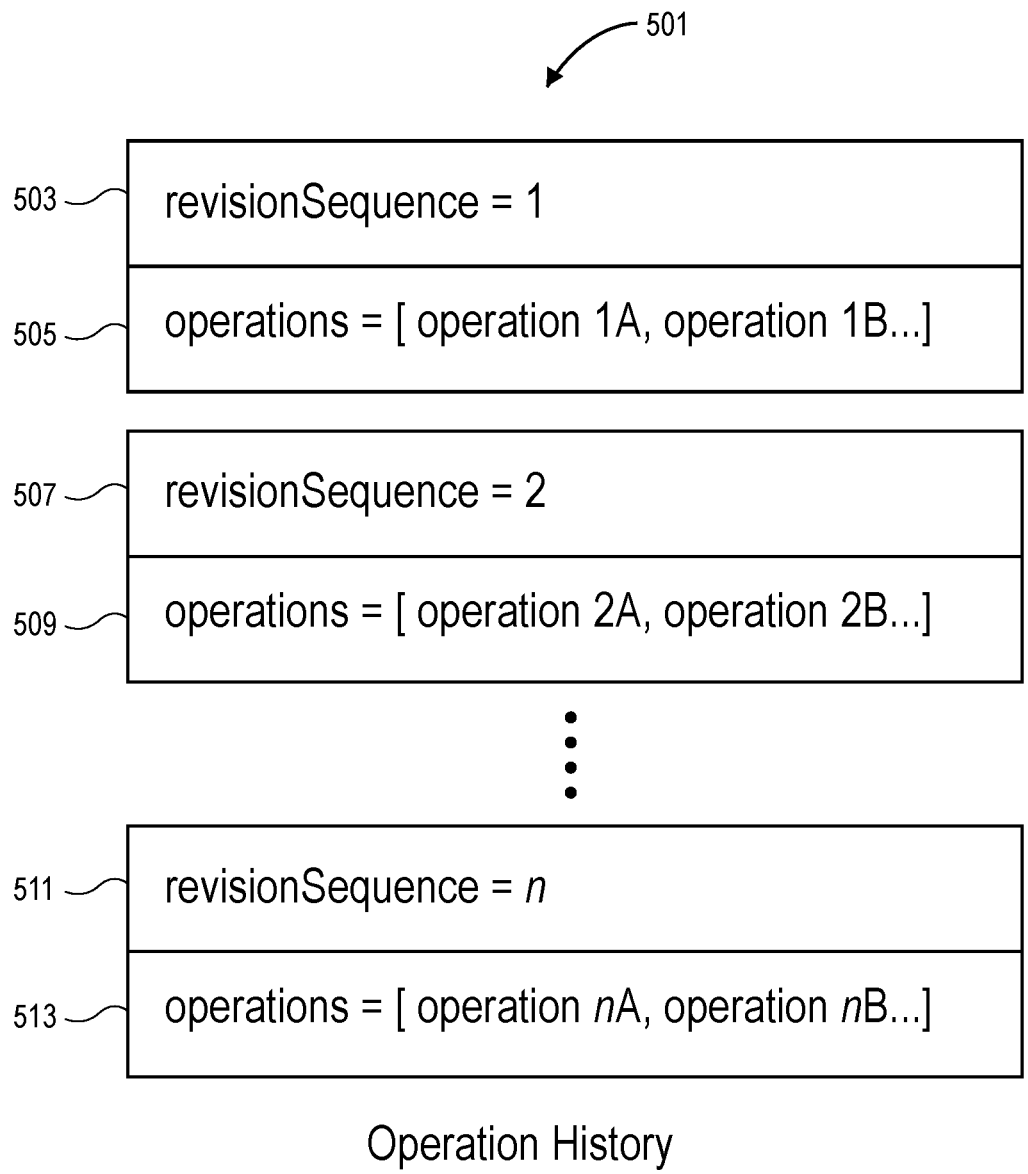
FIG. 5 shows an example of an operation history which can include revision sequence identifiers along with corresponding operations.

Here, A is the identifier of the text storage, {0,0} is the range in the text storage being replaced, and 5 is the length of the replacement. Without containing any actual content (e.g. user data), this operation (specified in this example by structural data) is sufficient for transforming other commands that modify the same text storage. Thus, the operational transformation techniques used in operation 411 can use this variation of operational transformation in which the content is not included in the transformation data used to transform commands. In one embodiment, operations from the transformed commands can be included in an operation history which is described further below and the first device can use the operations from the transformed commands in the operation history in operation 411. FIG. 5 shows an example of an operation history. In one embodiment, operation 411 is performed without any rollback of the first document (unlike the collaboration method shown in operation 207 in FIG. 2).

In one embodiment, while the transformations in operation 411 are being performed, the first device can also receive and apply further commands in operation 413 which edit the local version (also referred to as the "active document") while applying transformed commands to the first document in operation 411. This allows a user to continue to edit the local version while operation 411 is being performed; this also allows the user continued access to the document and makes the replacement of the local version with the first document appear seamless to the user. Thus, the client device which is the first device in this example can continue optimistically applying commands while the document is synchronizing and existing commands are being transformed. This is described further below by staging a copy of the document and processing it while the client still concurrently edits the older active document. When all optimistically applied commands are transformed, the active document can be seamlessly replaced with the staging document in the user interface. This is described further below in conjunction with FIGS. 8A through 8F. Then in operation 415 the first device can transmit the transformed commands in an outgoing command queue to the collaboration server. These transformed commands where the commands transformed in operation 411. The server can use these transformed commands to update the server copy, and operation 203 shown in FIG. 2 provides an example of such updating. The first device can perform operation 417 after operations 411 and 413 have applied transformed commands to the first document. In operation 417 the first device replaces the local version with the first document (referred to as a staging document) which then becomes the new local version or active document at the first device. Operation 415 can be performed after operation 417. Processing can then revert back to operation 407 which can use the method shown in FIG. 2 and described above to maintain the local version at the first device in the collaboration with the collaboration server; once the first device has come back online and has completed the processing of the method shown in FIG. 4, the first device can use its local version to stay current with the collaboration as long as it remains online and there is no need to use a server truth copy from the cloud storage platform to remain current as long as it remains online (or within the boundary of the testing in operation 405).

Each time a collaboration server in one embodiment applies a group of commands to the server copy, it increments the document's revision sequence number which can be a monotonically increasing integer that corresponds to each successive state of the document when commands are applied in the server order. When a client device receives a group of commands from the server, it receives them with the same revision sequence number, which the client applies to its local copy of the document when it applies those commands. In one embodiment, the revision sequence numbers can be included in the operation history that can be included in the server truth copy stored on the cloud storage platform.

FIG. 5 shows an example of an operation history that includes the revision sequence numbers and information about the operations at each revision sequence number; in one embodiment, the operations can describe the commands, as noted above, without including the content which can be found in the document obtained from the cloud storage platform as described herein. The operation history 501 in FIG. 5 includes at least 3 sets of operations 505, 509, and 513. In each set of operations, one or more of the operations or commands are described, and each set includes a revision sequence number 503, 507 and 513. The operation history 501 can be a collection of entries where each entry contains: the operational transformation operations of all commands that were applied to the server copy of the document by the sever at a given revision sequence (with the order of the one or more commands within a revision sequence number being specified in the operations, such as set of operations 505) and the revision sequence number at which those commands were applied to the server truth copy document in the server order. These entries can be stored in the operation history in the revision sequence number order, providing a sequential timeline, in the operation history, of the operations of all commands that were previously applied to the document in server order. In one embodiment, since the operations in the operation history can contain just the change in the document's structure but no content, the operations in the operation history can be significantly smaller than the commands that originally created them. In addition, they can contain no personal identifiable information so they can help to preserve privacy. In one embodiment, the operation history can be stored in the server truth document that is uploaded from the collaboration server to the cloud storage platform and then stored on the cloud storage platform that can be permanent cloud storage. Because in one embodiment, the server adds an entry to the operation history for each document revision sequence number, the revision sequence of the last operation history entry will match the revision sequence number of the document.

Figure 6:
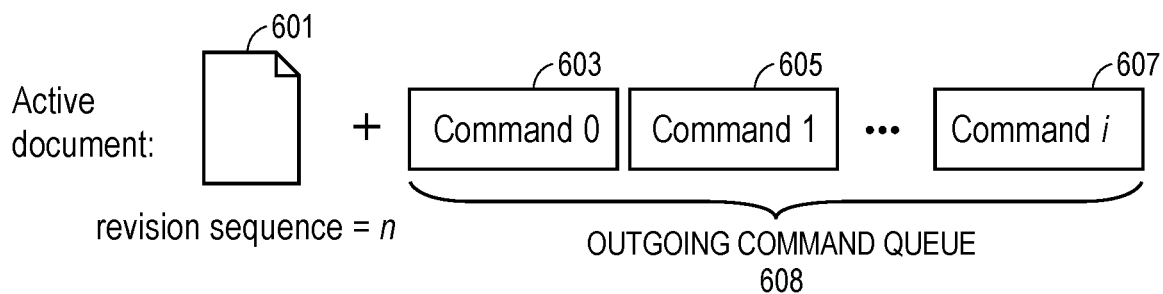
FIG. 6 shows an example of an active document on a device which can be off-line relative to a document collaboration service.
Figure 7:
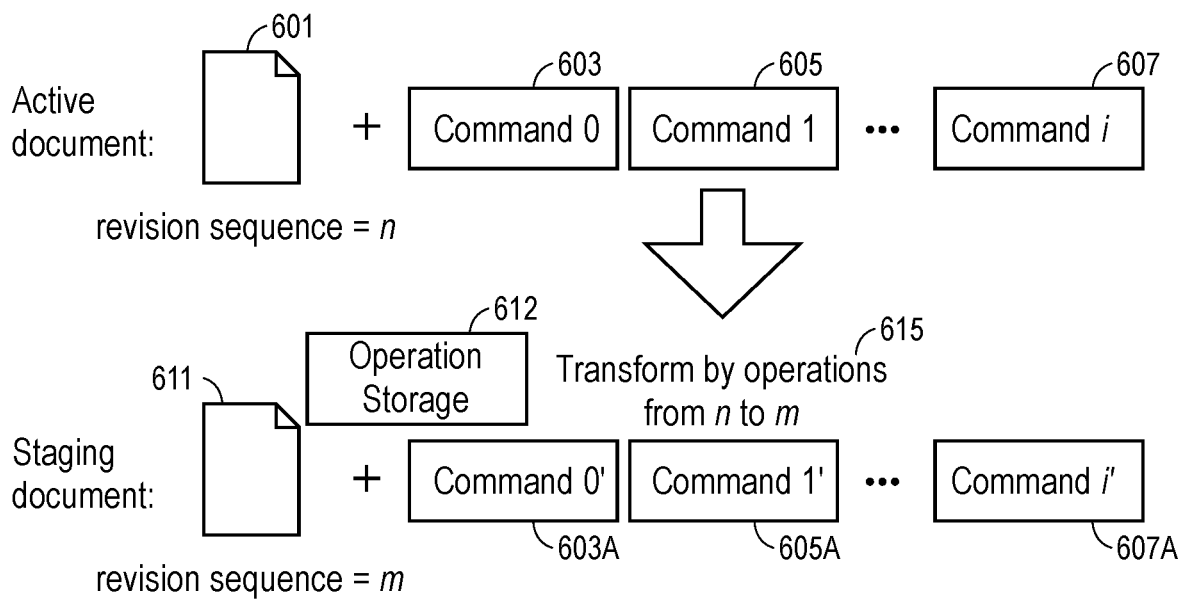
FIG. 7 shows an example of a process for using a staging document after a device has reestablished a connection with the collaboration environment.

FIGS. 6 and 7 show an example of how an off-line client with an active document, which is the local copy on the off-line client, can catch up to the current state of a collaboration in a collaboration service using an operation history which can be stored in the server truth document stored, for example, on a cloud storage platform or on the one or more servers that provide collaboration services. FIG. 6 shows the active document 601 of the off-line client and also shows an outgoing command queue which includes commands 603, 605 and 607. The commands 603, 605, and 607 were entered while the client device was off-line relative to the collaboration service. The commands 603, 605, and 607 are stored in an outgoing command queue because they have not been acknowledged as received from the collaboration server. Thus, FIG. 6 represents an example in which a user of the client device has performed document edits by entering and executing commands on the active document 601 while the client device hosting the active document 601 is off-line. As shown in FIG. 6, the client device stores the document at document revision sequence n, and the commands 603, 605, and 607 are optimistically applied to the document and queued, in execution order, in the outgoing command queue 608. This copy of the document, at revision sequence n with the optimistically applied local commands is the active document that is visible to the user in the user interface on the off-line client device. After the client device connects to the collaboration service it can obtain from the cloud storage platform the latest version of the server truth document stored on the cloud storage platform which in the example shown in FIG. 7 is at revision sequence m. This copy of the document is the staging document 611 which is not yet visible to the user in one embodiment. As shown in FIG. 7, the commands in the outgoing command queue 608 are transformed using the operational transformation operations 615 based on the staging document's operation storage 612 which includes, in one embodiment, an operation history (such as the operation history shown in FIG. 5) which can be used to create the operational transformation operations to transform the commands between revision sequence n and revision sequence m which is the latest revision of the document in the collaboration service. Operational transformation operations 615 transform commands 603, 605, and 607 into commands 603A, 605A, and 607A respectively as shown in FIG. 7. These transformed commands are then applied to the staging document 611 and are also sent to the collaboration server. The operations shown in FIGS. 6 and 7 correspond to operations shown in FIG. 4; for example, the receipt of commands while the client device is off-line corresponds to operation 401 in FIG. 4. The transformation operations 615 correspond to operation 411 in FIG. 4, and the transmission of the transformed commands to the collaboration server correspond to operation 415 in FIG. 4. In one embodiment, the active document can be seamlessly replaced with the staging document in the user interface after the transformed commands have been applied to the staging document (thereby becoming the active document itself on the client device), and this replacement can be before the transformed commands are transmitted to the collaboration server and acknowledged as received by the collaboration server. After the transformed commands have been applied to the staging document, traditional collaboration using the method of FIG. 2 described above can resume. Note that instead of rolling back local commands to the document revision sequence n on which they were optimistically applied, the local commands are transformed and then applied directly to the newly downloaded document at revision sequence m. In one embodiment, the example shown in FIGS. 6 and 7 can use operation 413 in FIG. 4. Since the processing on the staging document is not visible in the user interface until all local commands have been transformed and applied, it can be performed concurrently with continued user edits in the active document. In other words, the user can continue to edit the active document while the operational transformations 615 are being performed. As the user continues queuing optimistically applied outgoing commands to the active document, those commands can be appended to the existing outgoing command queue to be transformed from revision sequence n to revision sequence m and applied to the staging document. When all commands in the outgoing command to have been transformed and applied to the staging document, the staging document can seamlessly replace the active document in the user interface as described above.

Figure 8A:
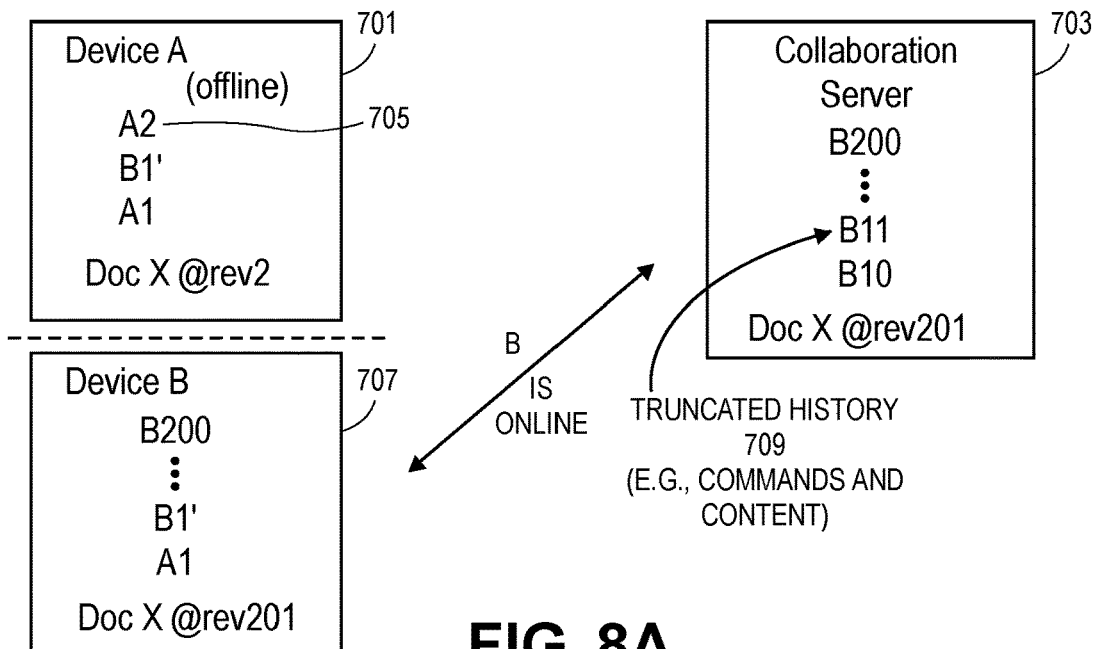
FIG. 8A shows an example of a collaboration environment which can exist while at least one device is off-line.

FIGS. 8A, 8B, 8C, 8D, 8E, and 8F show another example of how an off-line client device can resume participation in a collaboration with the collaboration service which can include one or more collaboration servers. In FIG. 8A device A is off-line while device B is online and is sending edits represented by commands to the collaboration server 703 which includes a truncated history 709 which can include commands and content (relative to those commands) based upon the commands received from device B. Device A includes an off-line command 705 which has been entered at the device A while the device is off-line. Device B has sent many commands, including commands B10 through B200, to the collaboration server 703 while device A has been off-line. As shown in FIG. 8A, device A includes a collaboration cache document 701 (which is the local copy of the document or local version of the document for device A) which represents the document X at revision 2 while device B includes a collaboration cache document 707 (which is the local copy of the document or local version of the document for device B) that represents the document X at revision 201 (which has many revisions to document X after revision 2). The collaboration server 703 includes a copy of the server truth document and also includes a truncated history 709 which can be used to provide transformed commands to the client devices to ensure that the client devices are up-to-date relative to the server copy during the collaboration. The truncated history 709 can be maintained for the most recent commands, such as the most recent commands in the last 5 minutes, that have been received from all client devices that are involved in the collaboration; the truncated history 709 can be used in operation 205 (in FIG. 2) to transmit the most recent commands to all client devices that are on-line in the collaboration. The collaboration server 703 contains the server truth document X at revision 201.

Figure 8B:
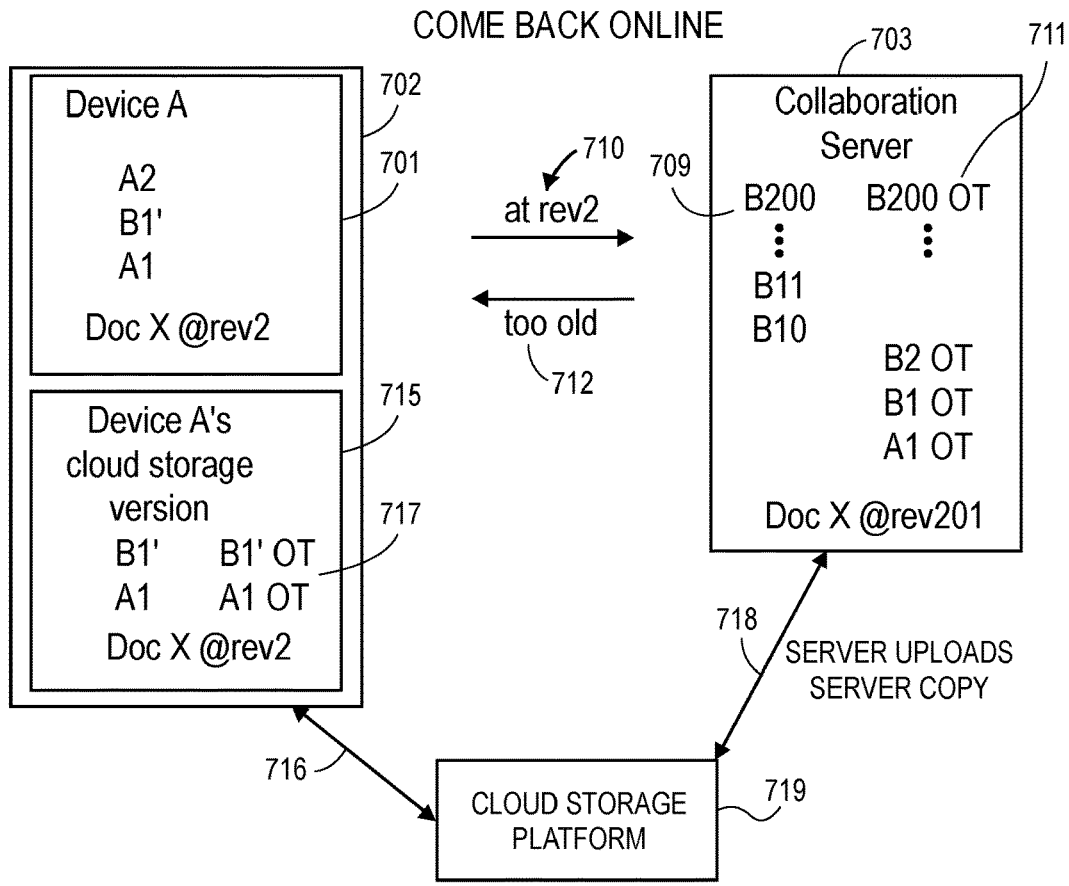
FIG. 8B shows an example of a collaboration environment after a device has just come back online to the collaboration environment.
Figure 8C:
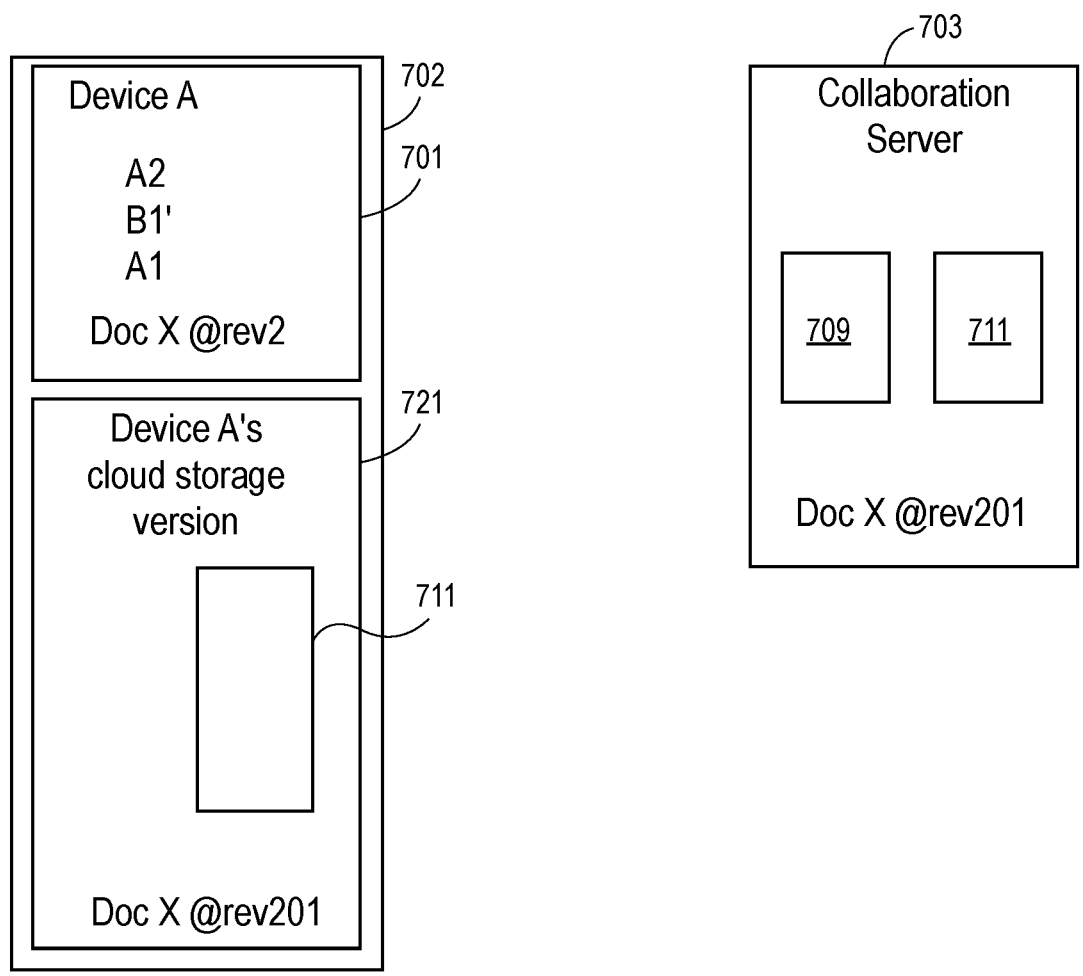
FIG. 8C shows an example of a collaboration environment at a previously off-line device that has now come online and has received an update from a cloud storage platform.
Figure 8D:
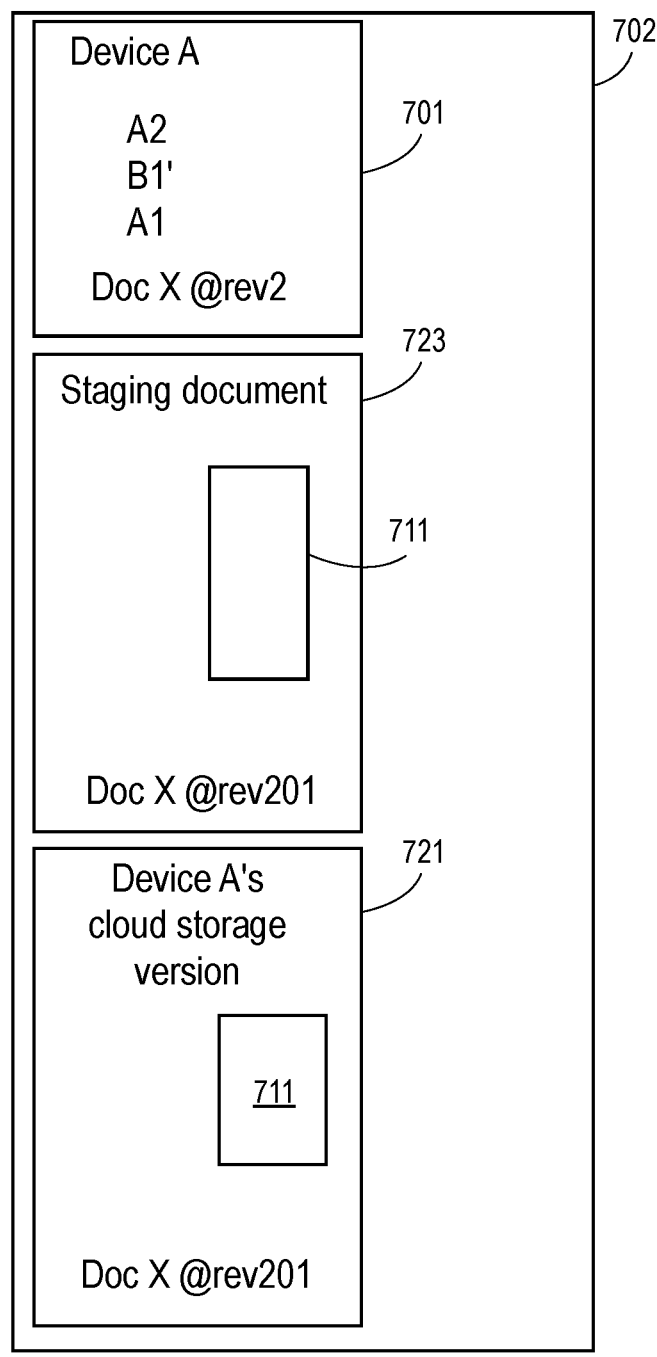
FIG. 8D shows an example of a device which has recently come back online with a collaboration service and which has received an updated cloud storage version of the document and which has created a staging document on the device.
Figure 8E:
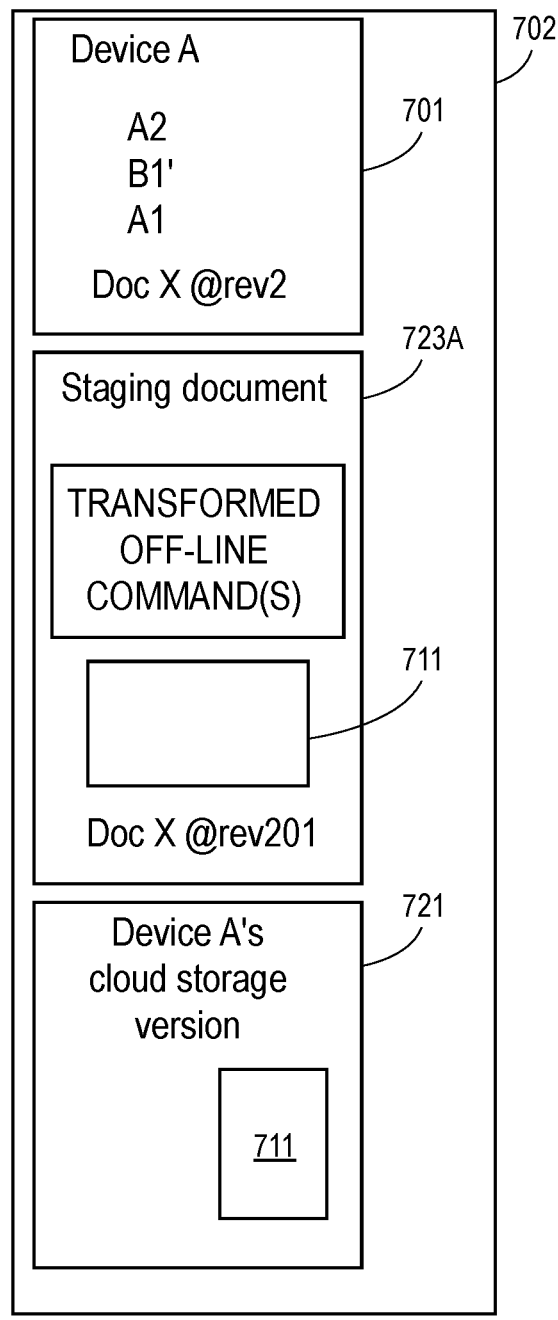
FIG. 8E shows an example of the device of FIG. 8D after the commands have been transformed and applied to the staging document on the device.
Figure 8F:
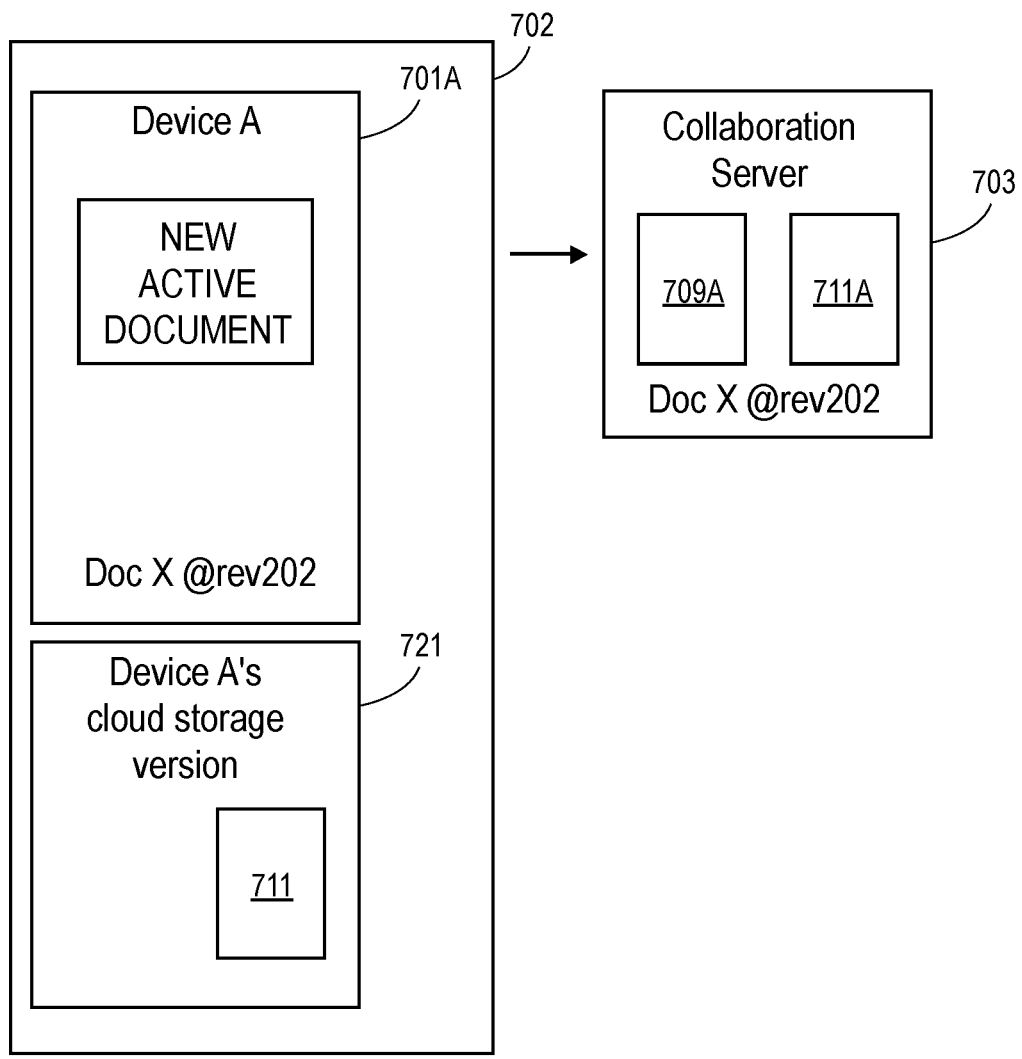
FIG. 8F shows the device of FIG. 8D after the transformed commands have been sent to a collaboration service according to one embodiment.

FIG. 8B shows the state of device A once it comes back on line and reconnects with the collaboration server 703. The collaboration server 703 can periodically and repeatedly upload 718 the most recent version of the server truth document to the cloud storage platform 719. The server truth document can include the entire content of the server truth document and also include an operation history, such as operation history 711 which can be similar to the operation history shown in FIG. 5. In one embodiment, the operation history 711 can include information about the commands without including the content that is processed by the commands. The uploading of the server truth document with the operation history 711 can cause the cloud storage platform 719 to store the server truth document with the operation history and can also cause the cloud storage platform to either push the server truth copy with the operation history to off-line client devices that have come back online or wait for such client devices to request a copy of the server truth document along with the operation history. Thus, device A can receive 716 an updated version of the server truth document from the cloud storage platform 719 and that updated cloud storage version can replace the old local cloud storage version 715 shown in FIG. 8B. It can be seen that the old local cloud storage version 715 includes an older operation history 717. When device A comes back online, device A (device 702) can cause a transmission 710 of a revision number or some other data with respect to the current version of the document on device A. In response to that transmission 710, the collaboration server can send a message 712 indicating that the local copy on device A, which is the collaboration cache document 701, is too old to participate or catch up to the collaboration service. The transmission 710 and the message 712 in one embodiment can be part of operation 405 shown in FIG. 4. In another embodiment, the collaboration server 703 can compare the time period that has lapsed since device A was last connected to collaboration server 703 to the time period of the truncated history 709; for example, if truncated history 709 is limited to the last 5 minutes of commands/changes to the document and the device A has been disconnected from collaboration server 703 for more than 5 minutes, then device A's collaboration cache document 701 may be too old. It will be appreciated that the last 5 minute period of the truncated history 709 is an example of one possible time period, and other time periods for the truncated history can be used that are longer or shorter. As a result, device A either requests or is pushed an updated version of the server truth document which replaces the old local cloud storage version 715. This is shown in FIG. 8C in which device A (device 702) now has the local cloud storage version 721 which includes an updated operation history which is the operation history 711 from the collaboration server 703. As shown in operation 8D, the device A can replicate the local cloud storage version 721 to create a staging document 723 which initially matches the content of the local cloud storage version 721. Then, the staging document is transformed 723A, as shown in FIG. 8E, by taking each off-line command (e.g. A2) and transforming it with operation history 711 to create a transformed off-line command which is later sent to a collaboration server to be added to the truncated history to create truncated history 709A shown in FIG. 8F. The staging document can then be edited by applying the transformed command to the staging document which can then be used to replace the active document which was the collaboration cache document 701. The replacement of the old active document with the transformed staging document is shown in FIG. 8F. After the transformed staging document becomes the new active document 701A on client device 702, normal collaboration, such as the collaboration method shown in FIG. 2, can be resumed while the device 702 remains online relative to the collaboration service.

Figure 9:
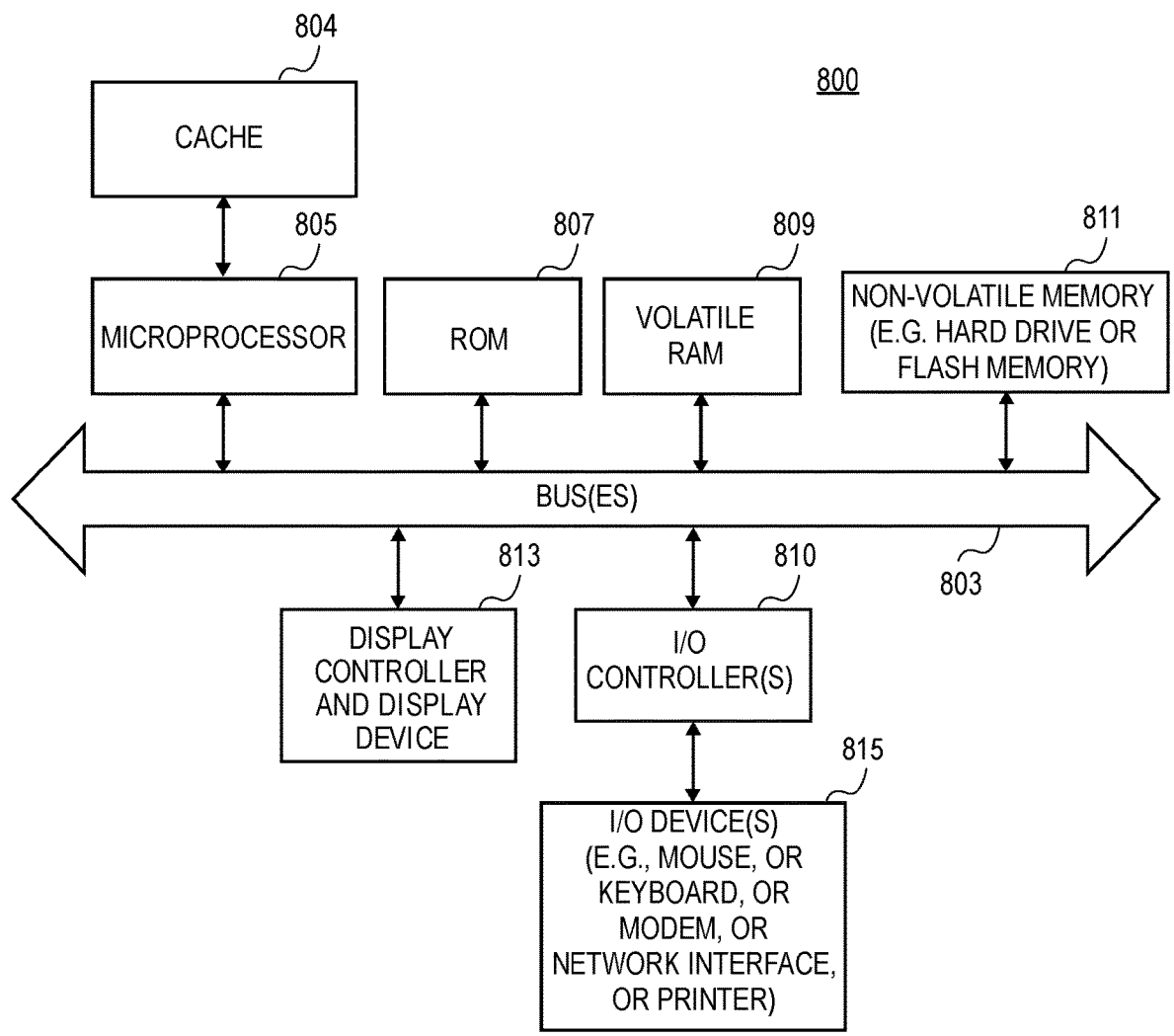
FIG. 9 shows an example of a data processing system that can be used to implement or perform one or more embodiments described herein.

FIG. 9 shows one example of a data processing system 800, which may be used with one embodiment. For example, the system 800 may be implemented to provide systems such as systems 103, 104, 101 and 100 shown in FIG. 1. Note that while FIG. 9 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 9, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 9 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

The foregoing discussion merely describes some exemplary embodiments of the disclosure. One skilled in the art will readily recognize from such discussion, the accompanying drawings and the claims that various modifications can be made without departing from the spirit and scope of the disclosure. The specification and drawings are, accordingly, to be regarded in an illustrative sense rather than a restrictive sense.

What is claimed is:

1. A non-statutory machine readable medium storing executable instructions which when executed by a data processing system cause the data processing system to perform a method comprising:

establishing, at a first device, a connection to one or more servers that provide document collaboration services for multiple users to collaborate on a document processed by and stored on the one or more servers;

receiving, at the first device, a first document that represents a recent collaboration state of the document based on changes to the document made by other devices while the first device was not connected to the one or more servers;

applying, at the first device, one or more changes to the first document, the one or more changes based on one or more commands received at the first device while the first device was not connected to the one or more servers;

transmitting, from the first device to the one or more servers, one or more transformed commands that are based on the one or more commands received at the first device while the first device was not connected to the one or more servers; and determining whether a second document, which was updated by the first device while the first device was not connected to the one or more servers, will be used to stay current with the recent collaboration state;

wherein the first document is a server truth document that represents and contains the recent collaboration state of the collaboration; and wherein the first document includes an operation history that is a collection of entries, and each entry in the collection of entries includes a revision sequence number and a list of operations of all commands that were applied by the one or more servers in a server order to the first document, and wherein the collection of entries are stored in the operation history in revision sequence order based on revision sequence numbers and the operation history provides a sequential timeline of the operations of all commands that were previously applied to the first document in the server order.

2. The medium as in claim 1 wherein the second document will not be used to stay current based on one or more of (a) a comparison of a revision sequence number associated with the second document to a revision sequence number associated with the first document; or (b) a time period that has lapsed since the first device was last connected to the one or more servers; or (c) a number of commands received by the one or more servers while the first device was not connected to the one or more servers.

3. The medium as in claim 1 wherein the first document is received in response to determining that the second document will not be used to stay current or as a result of a synchronization with a cloud storage platform.

4. The medium as in claim 1 wherein the one or more commands, received at the first device while the first device was not connected to the one or more servers, were applied to the second document prior to establishing the connection to the one or more servers.

5. The medium as in claim 1 wherein the method further comprises:

applying rollback operations and reapply operations to a later version of the first document stored at the first device after transmitting the transformed commands;

losing the connection with the one or more servers after applying rollback and reapply operations and then re-establishing the connection;

determining, in response to re-establishing the connection, that the later version of the first document will be used to stay current with the collaboration;

applying further rollback and reapply operations to the later version of the first document after re-establishing the connection.

6. The medium as in claim 1 wherein the operations in the operation history specify changes in document structure but contain no content from the first document.

7. The medium as in claim 1, wherein the method further comprises:

determining that a second document, which was updated by the first device with offline commands while the first device was not connected to the one or more servers, will not be used to stay current with the recent collaboration state;

applying, by the first device, edits to the second document, wherein the edits are received at the first device and applied by the first device while the first device is applying the one or more changes to the first document.

8. The medium as in claim 7, wherein the method further comprises:

discarding the second document after completing the application of the one or more changes to the first document;

using a later version of the first document to stay current with the collaboration.

9. The medium as in claim 1 wherein the first document is received from a cloud storage service server which is distinct from the one or more servers that provide the document collaboration services.

10. A method comprising:

establishing, at a first device, a connection to one or more servers that provide document collaboration services for multiple users to collaborate on a document processed by and stored on the one or more servers;

receiving, at the first device, a first document that represents a recent collaboration state of the document based on changes to the document made by other devices while the first device was not connected to the one or more servers applying, at the first device, one or more changes to the first document, the one or more changes based on one or more commands received at the first device while the first device was not connected to the one or more servers transmitting, from the first device to the one or more servers, one or more transformed commands that are based on the one or more commands received at the first device while the first device was not connected to the one or more servers; and determining whether a second document, which was updated by the first device while the first device was not connected to the one or more servers, will be used to stay current with the recent collaboration state;

wherein the first document is a server truth document that represents and contains the recent collaboration state of the collaboration; and wherein the first document includes an operation history that is a collection of entries, and each entry in the collection of entries includes a revision sequence number and a list of operations of all commands that were applied by the one or more servers in a server order to the first document, and wherein the collection of entries are stored in the operation history in revision sequence order based on revision sequence numbers and the operation history provides a sequential timeline of the operations of all commands that were previously applied to the first document in the server order.

11. The method as in claim 10 wherein the second document will not be used to stay current based on one or more of (a) a comparison of a revision sequence number associated with the second document to a revision sequence number associated with the first document; or (b) a time period that has lapsed since the first device was last connected to the one or more servers; or (c) a number of commands received by the one or more servers while the first device was not connected to the one or more servers.

12. The method as in claim 10 wherein the first document is received in response to determining that the second document will not be used to stay current or as a result of a synchronization with a cloud storage platform.

13. The method as in claim 10 wherein the one or more commands, received at the first device while the first device was not connected to the one or more servers, were applied to the second document prior to establishing the connection to the one or more servers.

14. The method as in claim 10 wherein the method further comprises:
applying rollback operations and reapply operations to a later version of the first document stored at the first device after transmitting the transformed commands;
losing the connection with the one or more servers after applying rollback and reapply operations and then re-establishing the connection;
determining, in response to re-establishing the connection, that the later version of the first document will be used to stay current with the collaboration;
applying further rollback and reapply operations to the later version of the first document after re-establishing the connection.

15. The method as in claim 10 wherein the operations in the operation history specify changes in document structure but contain no content from the first document.

16. The method as in claim 10, wherein the method further comprises:
determining that a second document, which was updated by the first device with offline commands while the first device was not connected to the one or more servers, will not be used to stay current with the recent collaboration state;
applying, by the first device, edits to the second document, wherein the edits are received at the first device and applied by the first device while the first device is applying the one or more changes to the first document.

17. The method as in claim 16, wherein the method further comprises:
discarding the second document after completing the application of the one or more changes to the first document;
using a later version of the first document to stay current with the collaboration.

18. The method as in claim 10 wherein the first document is received from a cloud storage service server which is distinct from the one or more servers that provide the document collaboration services.

* * * * *